T. F. BARTON.
ROTARY TRANSFORMER.
APPLICATION FILED MAY 27, 1919.
1,343,026. Patented June 8, 1920.
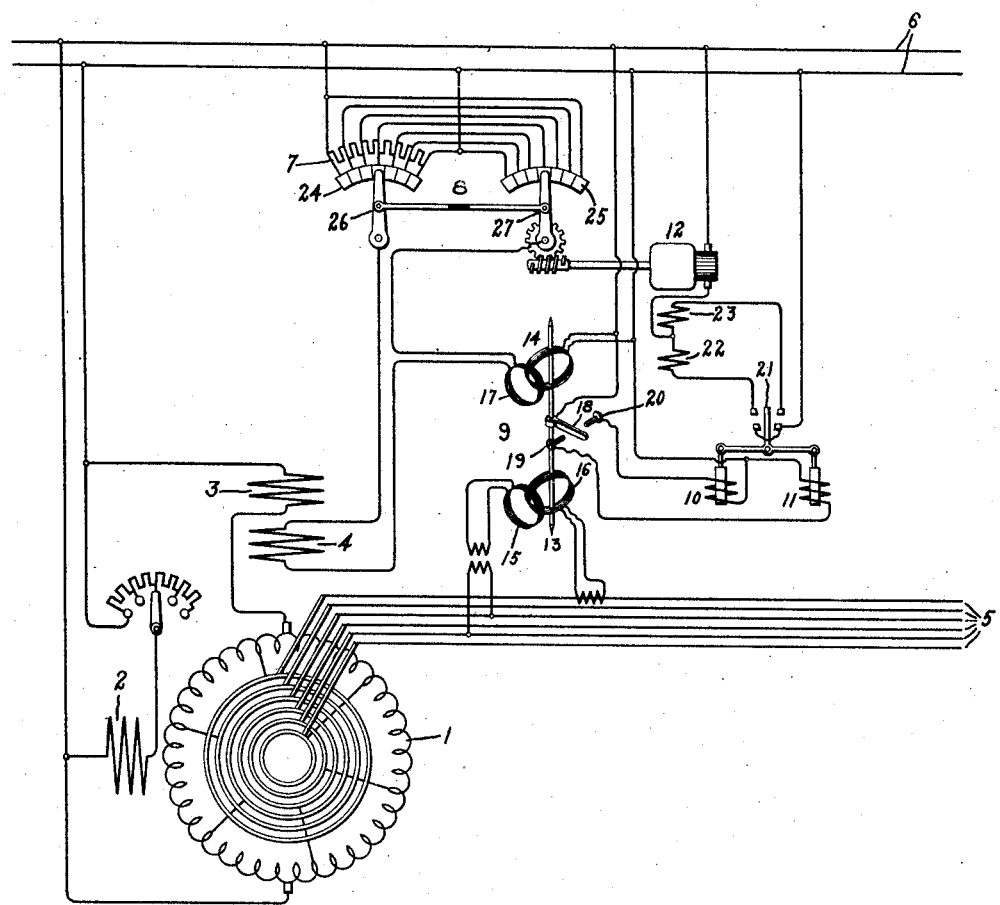
Inventor:
Theophilus F. Barton,
by Allen G. Davis
His Attorney.

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

ROTARY TRANSFORMER.

1,343,026.  Specification of Letters Patent.  Patented June 8, 1920.

Application filed May 27, 1919. Serial No. 300,127.

*To all whom it may concern:*

Be it known that I, THEOPHILUS F. BARTON, a citizen of the United States, residing at Schenectady, in the county of Schenectady, State of New York, have invented certain new and useful Improvements in Rotary Transformers, of which the following is a specification.

My invention relates to rotary transformers and particularly to single armature rotary transformers for transforming alternating current to direct current and provided with commutating poles. I have found that in actual practice if the power factor of the alternating current taken by such a single armature rotary transformer varies from unity more than a very small amount, it affects the commutating field strength to such an extent as to cause the rotary transformer to spark.

My invention has for its object the provision of a novel and simple arrangement whereby such a single armature rotary transformer can be made to commutate properly no matter what the power factor is of the alternating current taken by the rotary transformer. To this end, I provide the commutating poles with a commutating field winding which is excited substantially in proportion to the wattless component of the alternating current taken by the rotary transformer. I preferably provide the rotary transformer with two commutating field windings, one of which is connected in series with the direct current brushes of the rotary transformer and the other of which is connected to a source of direct current which may be varied over a wide range of voltage, and also reversed if desired. I control this source of current by a device which comprises an element having coils energized by the alternating voltage and alternating current of the alternating current mains supplying the rotary transformer so as to be responsive only to the wattless component of the current taken by the transformer and a balancing element having a coil energized by the direct current flowing through the commutating field winding, which is connected to the above mentioned source of direct current. This device controlling the current supplied the last mentioned commutating field winding will adjust the current in said commutating field winding in proportion to the wattless component of the alternating current taken by the rotary transformer, and thus excite this commutating field winding so that it will compensate for the magnetization or demagnetization of the commutating poles by the lagging or leading current in the armature of the transformer and thereby cause the transformer to commutate sparklessly.

For a better understanding of my invention, reference may be had to the following description taken in connection with the accompanying drawing in which the single figure shows diagrammatically one embodiment of my invention.

In the drawing I have shown one form of a single armature rotary transformer, that is, a rotary converter 1 having a main exciting winding 2, a series commutating field winding 3, and an auxiliary commutating field winding 4. The converter is connected on its alternating current side to the alternating current mains 5, and on the direct current side to the direct current mains 6. The auxiliary commutating field winding 4 is also connected to the direct current mains 6. The field produced by the auxiliary commutating field winding 4 may be varied and reversed by connecting it to a source of voltage which may be varied over a wide range and reversed. This source of voltage is shown as comprising a set of resistances 7 connected across the direct current mains 6. This set of resistances 7 is preferably the resistance elements of a double dial rheostat 8.

The movement of the double dial rheostat is controlled by a contact making device 9 through solenoids 10 and 11, which solenoids control a series motor 12 geared to the double dial rheostat 8. The device 9 comprises an element 13 and a balancing element 14. The element 13 has a coil 15 energized by the alternating voltage supplied the rotary converter, and a coil 16 energized by the alternating current supplied to the rotary converter. The coils 15 and 16 of the contact making device are so connected to the phases of the rotary converter as to be responsive only to the wattless component of the alternating current taken by the rotary converter. The balancing element of the contact making device comprises a coil 17 energized by the current flowing through the circuit of the auxiliary commutating field winding 4, it being connected in the circuit of this winding. The contact making device has a movable contact 18 and stationary contacts 19 and 20 which control the circuits of the solenoids 10 and 11, which in turn control the switch member 21. When one or the other of the solenoids 10 or 11 is energized, the motor 12 is connected across the direct current main 6 with one or the other of its field windings 22 or 23 connected in series with the motor, so that it rotates in one direction or the other and drives the double dial rheostat 8.

The resistances 7 of the double dial rheostat 8 are connected to two rows of contacts 24 and 25, and the terminals of the auxiliary commutating field winding 4 are connected to the arms 26 and 27 which are rigidly connected together and engage the rows of contacts 24 and 25. The voltage applied to the field winding 4 is varied and reversed as the arms 26 and 27 move from left to right.

The operation of my arrangement is as follows:

Assume now that the arms 26 and 27 are in their mid-position, in which case no voltage is applied to the winding 4. Suppose then that load is put on the rotary converter and the adjustment of the main field 2 is such that the power factor of the alternating current taken by the rotary converter varies from unity. This causes wattless current to be supplied to the rotary converter, which energizes the coils 15 and 16 of the element 13 of the contact making device to produce a torque. The torque produced moves the contact 18 so as to close the circuit of one or the other of solenoids 10 or 11 and thus the motor 12 is energized so that it will rotate in one direction or the other, and move the double dial rheostat 8 from its mid-position. Voltage is then supplied to the auxiliary commutating field winding 4 from the double dial rheostat so that a field is produced by the winding 4. The arms 26 and 27 continue to move until the current supplied the winding 4 is sufficient to produce a torque in the coils of the balancing element 14 of the contact making wattmeter equal to the torque in the element 13. This will cause the contact 18 to move and open the circuit of the solenoid 10 or 11 and the arms 26 and 27 to come to rest. The current will now flow through the auxiliary commutating field winding 4 in proportion to the wattless component of the alternating current taken by the rotary converter.

If the wattless component of the alternating current taken by the rotary converter changes due to any well known cause, the contact making device 9 will be thrown out of balance and the contact 18 will again close and change the current in the auxiliary commutating field winding 4 until the balancing element 14 again operates to open the circuit of the solenoid 10 or 11. The current flowing through the auxiliary commutating field winding 4 will then again be proportional to the wattless component of the alternating current taken by the rotary converter.

The auxiliary commutating field winding 4 is connected up with the double dial rheostat 8 in such a manner that the current flowing through said field winding opposes the series commutating field winding when the rotary converter is operating with lagging current and so as to assist the field produced by the series commutating field winding when the rotary converter is operating with leading current. Since the double dial rheostat operates not only to vary but also to reverse the current supplied the auxiliary commutating field winding, it is evident that if the auxiliary commutating field winding is connected up with the double dial rheostat correctly for either leading or lagging current, the contact making device will always operate to send current through the auxiliary commutating field winding in the right direction for either leading or lagging alternating current.

Although I have described and illustrated my invention in connection with an ordinary rotary converter, I desire it to be understood that it is applicable to the rotary converter part of any other type of rotary converter, such as a booster rotary converter or a motor converter, and to any form of single armature transformer for transforming alternating current to direct current, such as a dynamotor, and I aim in the appended claims to cover such modifications as well as any other modifications which do not depart from the spirit and scope of my invention.

What I claim as new and desire to secure by Letters Patent of the United States, is:—

1. In combination, alternating current mains, a single armature rotary transformer connected thereto and having a commutating field winding, and means for exciting said commutating field winding substantially in proportion to the wattless component of the alternating current taken by said rotary transformer.

2. In combination, alternating current mains, a single armature rotary transformer connected thereto and having a commutating field winding, and means responsive only to the wattless component of the alternating current taken by said rotary transformer for exciting said commutating field winding.

3. In combination, alternating current mains, a single armature rotary transformer connected thereto and having a commutating field winding, means for exciting said commutating field comprising a contact making device having an element responsive only to the wattless component of the alternating current taken by said rotary transformer.

4. In combination, alternating current mains, a single armature rotary transformer connected thereto and having a commutating field winding, means for varying the field produced by said commutating field winding, and means for controlling said last mentioned means comprising an element having coils energized by the alternating voltage and alternating current of said alternating current mains so as to be responsive only to the wattless component of the alternating current taken by said rotary transformer.

5. In combination, alternating current mains, a single armature rotary transformer connected thereto and having a commutating field winding, means for varying the field produced by said commutating field winding, and means for controlling said last mentioned means comprising an element having coils energized by the alternating voltage and alternating current of said alternating current mains so as to be responsive only to the wattless component of the alternating current taken by said rotary transformer and a balancing element having a coil energized by the current flowing through said commutating field winding.

6. In combination, alternating current mains, a single armature rotary transformer connected thereto and having a commutating field winding, direct current mains, a double dial rheostat having arms and being connected across said direct current mains, said commutating field winding being connected to said arms of said rheostat, and means for controlling said double dial rheostat comprising a contact making device having an element responsive only to the wattless component of the alternating current taken by said rotary transformer.

7. In combination, alternating current mains, a single armature rotary transformer connected thereto and having a commutating field winding, direct current mains, a double dial rheostat having arms and being connected across said direct current mains, said commutating field winding being connected to said arms of said rheostat, and means for controlling said double dial rheostat comprising a contact making device comprising an element having coils energized by the alternating voltage and alternating current of said alternating current mains so as to be responsive only to the wattless component of the alternating current taken by said rotary transformer and a balancing element having a coil energized by the current flowing through said commutating field winding.

8. In combination, alternating current mains, a single armature rotary transformer connected thereto, said rotary transformer having a series commutating field winding and an auxiliary commutating field winding, and means for exciting said auxiliary commutating field winding substantially in proportion to the wattless component of the alternating current taken by said rotary transformer.

9. In combination, alternating current mains, a single armature rotary transformer connected thereto, said rotary transformer having a series commutating field winding and an auxiliary commutating field winding, and means responsive only to the wattless component of the alternating current taken by said rotary transformer for exciting said auxiliary commutating field winding.

10. In combination, alternating current mains, a single armature rotary transformer connected thereto, said rotary transformer having a series commutating field winding and an auxiliary commutating field winding, means for varying the field produced by said auxiliary commutating field winding, and means for controlling said last mentioned means comprising a contact making device having coils energized by the alternating voltage and alternating current of said alternating current mains so as to be responsive only to the wattless component of the alternating current taken by said rotary transformer and a balancing element having a coil energized by the current flowing through said auxiliary commutating field winding.

11. In combination, alternating current mains, a single armature rotary transformer connected thereto, said rotary transformer having a series commutating field winding and an auxiliary commutating field winding, direct current mains, a double dial rheostat having arms connected across said direct current mains, said auxiliary commutating field winding being connected to said arms of said rheostat, and means for controlling said double dial rheostat comprising a contact making device, said contact making device having an element responsive only to the wattless component of the alternating current taken by said rotary transformer.

12. In combination, alternating current mains, a single armature rotary transformer connected thereto, said rotary transformer having a series commutating field winding and an auxiliary commutating field winding, direct current mains, a double dial rheostat having arms connected across said direct current mains, said auxiliary commutating field winding being connected to said arms of said rheostat, and means for controlling said double dial rheostat comprising a contact making device, said contact making device having an element having coils energized by the alternating voltage and alternating current of said alternating current mains so as to be responsive only to the wattless component of the alternating current taken by said rotary transformer and a balancing element having a coil energized by the current flowing through said auxiliary commutating field winding.

In witness whereof, I have hereunto set my hand this 26th day of May, 1919.

THEOPHILUS F. BARTON.